March 15, 1949.  A. G. GURRIES ET AL  2,464,227
LEVELER
Filed Sept. 23, 1946  3 Sheets-Sheet 1
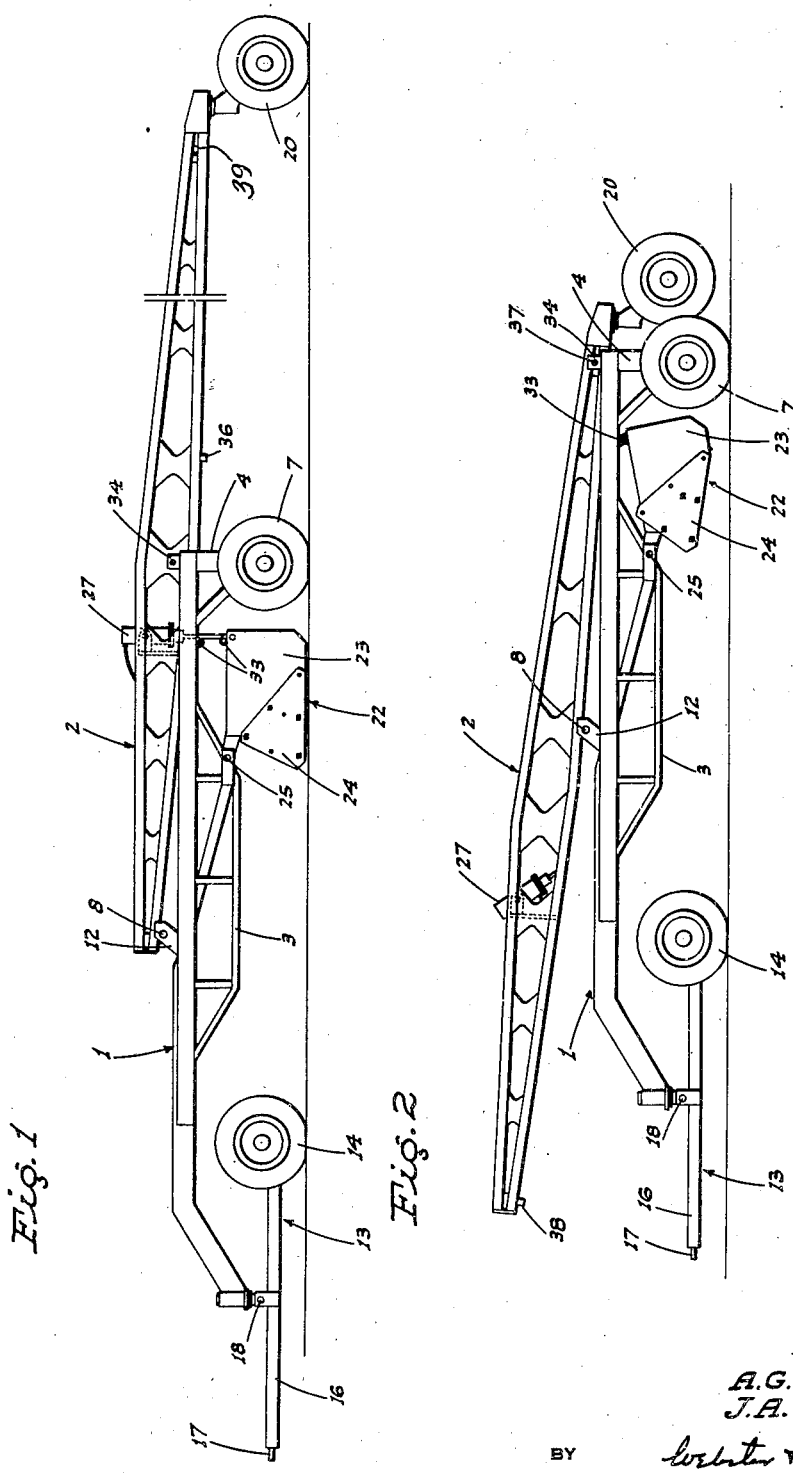
INVENTORS
A.G.Gurries
J.A.White Jr.
BY
Webster & Webster
ATTORNEYS March 15, 1949.　　　A. G. GURRIES ET AL　　　2,464,227
LEVELER Filed Sept. 23, 1946　　　　　　　　　　　3 Sheets-Sheet 2

INVENTOR.
A.G.Gurries
BY　J.A.White Jr.
ATTYS

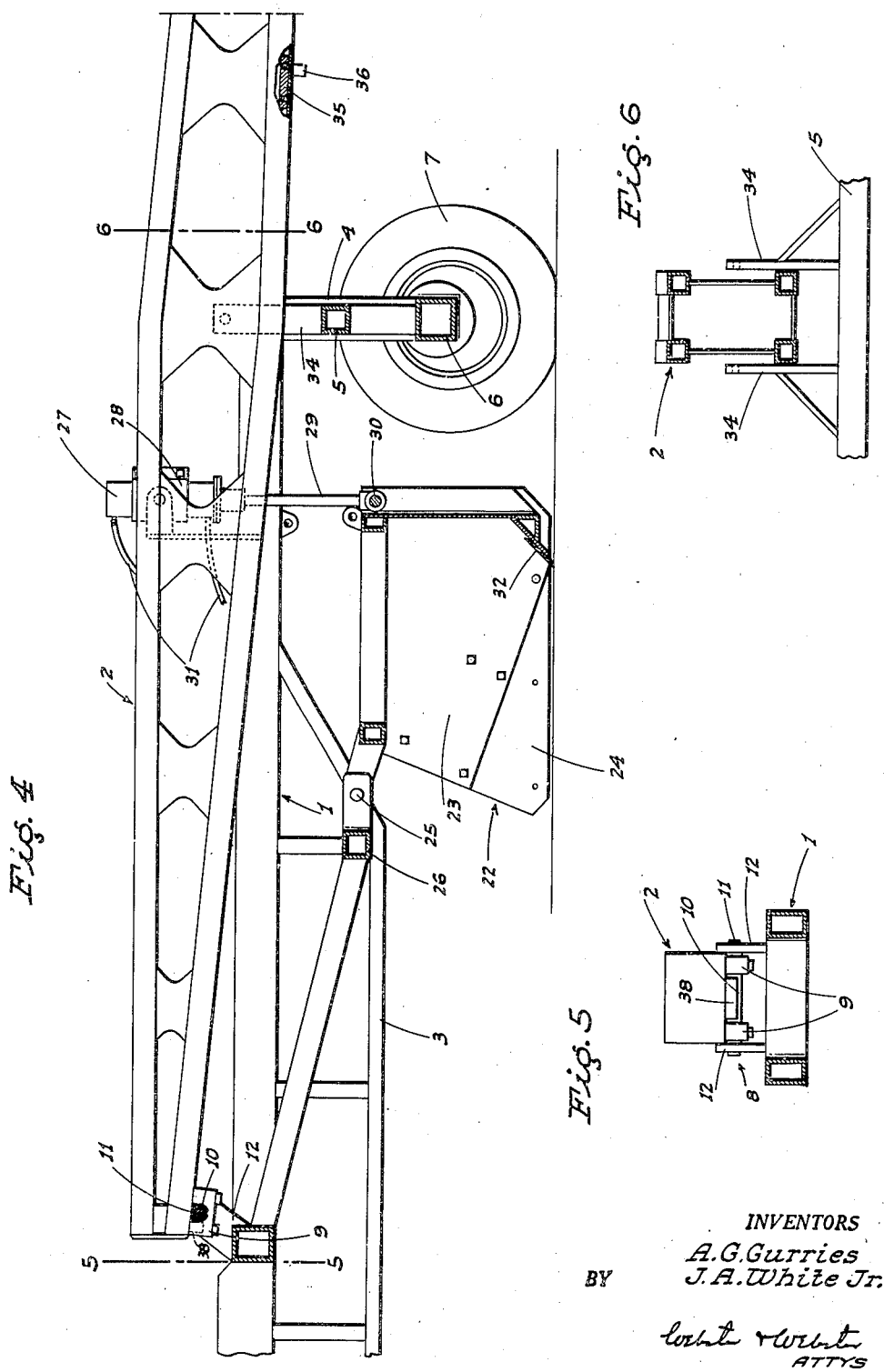

Patented Mar. 15, 1949

2,464,227

UNITED STATES PATENT OFFICE 2,464,227

LEVELER

Albert G. Gurries and John A. White, Jr., Gilroy, Calif.; said White assignor to said Gurries Application September 23, 1946, Serial No. 698,652

11 Claims. (Cl. 37—180)

This invention is directed in general to an earth scraping implement, and relates particularly to a finish leveler; such implement being a modification of the one shown in co-pending application for U. S. Letters Patent, Serial No. 628,227, filed November 13, 1945, which has matured into Patent No. 2,444,977, granted July 13, 1948.

The present implement incorporates, with other novel features, all the desirable characteristics of the implement of the identified copending application, such as accurate finish leveling with a minimum of blade adjustment, and the avoidance of any substantial vertical reaction, at the scraper blade unit, when the supporting wheels traverse humps or uneven conditions.

One novel feature of the implement herein disclosed is the arrangement of the elongated front and rear frame sections so that for transport the rear section, instead of mainly trailing the front section as in use, is mounted on top of said front section, thus materially reducing the overall length of the implement. This is necessary for convenience of transport on highways, railroad crossings, and to comply with highway regulations which commonly limit the overall length of vehicles permitted on the highways.

Another novel feature of the present invention is the provision of a fluid pressure actuated power cylinder operative to raise the scraper blade unit above its working position when desired; said power unit being interposed in a fluid pressure control system regulated by the operator from his station on the tractor to which the implement is connected in draft relation.

A further characteristic of this invention is the novel, swivelly mounted wheel truck supporting the implement at its forward end, such wheel truck making possible relatively sharp or short turns to right or left when the implement is in field use.

A further object of the invention is to provide a practical leveler, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the implement with the parts in position for use.

Fig. 2 is a similar view, but shows the parts in transport position.

Fig. 4 is an enlarged fragmentary sectional elevation taken through the central portion of the implement.

Fig. 5 is a cross section on line 5—5 of Fig. 4.

Fig. 6 is a cross section on line 6—6 of Fig. 4.

Figure 3:
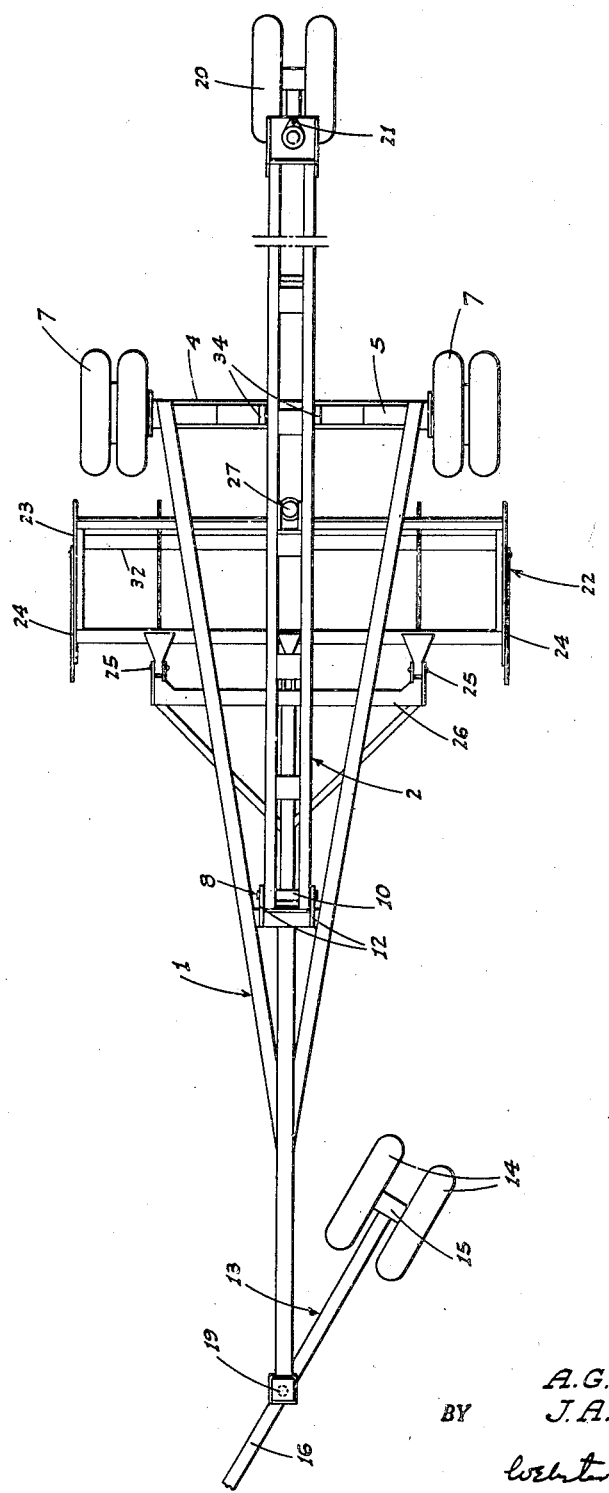
Fig. 3 is a plan view of the implement as arranged for use, i. e. as in Fig. 1.

Referring now more particularly to the characters of reference on the drawings, the implement comprises an elongated front frame section, indicated generally at 1, and an elongated rear frame section, indicated generally at 2.

The front frame section is trussed, as at 3, and increases in width from front to rear, as clearly shown in Fig. 3, and at its rear end includes a pair of transversely spaced, depending legs 4 connected together, in rigid relation, by a cross beam 5. Below the cross beam 5 the legs 4 are connected by an axle 6, and opposite ends of said axle are supported by dual-tired wheels 7. The wheels 7 are thus spaced apart a substantial distance, transversely of the implement, as shown.

The elongated rear frame section 2 is relatively narrow and of constant width from end to end; being of open or skeleton construction, as shown.

The forward end portion of the rear frame section 2 normally laps the rear portion of the front frame section 1; the forward end of the rear frame section being pivotally connected to the front frame section substantially centrally of the ends of the latter, as at 8, for relative vertical motion. The pivotal connection 8 includes pillow blocks 9 on the forward end of the rear frame section 2 engaging about a sleeve 10 on a cross shaft 11 carried between upstanding ears 12 on the front frame section 1.

At its forward end the implement is supported by a swivelly mounted draft truck, indicated generally at 13, which draft truck includes pneumatic-tired dual wheels 14 on an axle 15, and a rigid elongated tongue 16 projecting from the axle 15. At its forward end the tongue 16 is provided with a hitch 17 adapted for connection with a tractor.

Intermediate its ends the tongue 16 is pivoted, for relative vertical swinging motion, as at 18, to the lower end of a rotary kingpin 19 journaled in the forward end of the front section 1.

By reason of the above described draft truck arrangement, the tractor can turn sharply relative to the draft truck, and the draft truck can correspondingly turn short relative to the front frame section 1, with a consequence that the entire implement has a relatively short turning radius. This is a very desirable feature in elongated implements of the type described.

The trailing end of the rear frame section 2 is supported by a caster wheel unit, indicated generally at 20; there being a removable locking pin device 21 arranged to lock the caster wheel unit against swiveling out of a longitudinal line of travel, for the reasons hereinafter described.

Directly ahead of the intermediate, and transversely spaced, wheels 7 of the implement the latter is provided with a transversely extending scraper blade unit 22 which includes side plates 23 carrying vertically adjustable side wings 24.

At the forward and upper corners of the side plates 23 the scraper blade unit 22 is pivotally connected, as at 25, for vertical adjustment; the pivotal connection being with a transverse subframe 26 formed as a rigid unitary part of the front frame section 1.

By reason of the construction of the frame assembly herein employed, the scraper blade unit 22 can be relatively wide, which is a desirable feature in finish levelers.

The scraper blade unit 22 is vertically adjustably suspended at its rear end from the rear frame section 2, but ahead of the wheels 7, by means of a fluid pressure actuated power cylinder 27, of double acting type, adjustably clamped in an upstanding sleeve 28 pivoted to the rear section 2. The power cylinder 27 includes a downwardly projecting, normally fully extended piston rod 29 removably connected at its lower end, as at 30, to the scraper blade unit 22 intermediate the ends of the latter. The power cylinder 27 is connected with a fluid pressure supply system, shown in part at 31, which circulates forwardly to the tractor and is there valve-controlled by the tractor operator from his station.

It will be seen that with adjustment of the power cylinder 27 in the sleeve 28, the scraper blade unit 22, including the scraper blade 32, may be vertically adjusted to a selected, maximum working depth.

The power cylinder 27 is actuated to raise the scraper blade unit when necessary to dump a load, traverse banks, clear trash, relieve excess drag, or for transport.

When the implement is in use the piston rod 29 is of course connected to the scraper blade unit, but when the implement is arranged for transport in the manner hereinafter described, said rod is disconnected at the point 30, and the scraper blade unit is then supported, adjacent the rear, by a linkage connection 33 with the rear end portion of the front frame section. Also, for transport, the side wings 24 are adjusted upwardly in the manner shown in Fig. 2.

The cross beam 5, at the rear end of the front frame section 1, is provided, adjacent its central portion, with a pair of transversely spaced, upstanding guide brackets 34, between which the rear frame section 2 extends in guided relation, whereby to prevent any relative lateral deflection between the front and rear frame sections 1 and 2.

To prepare the implement for transport, with the rear section 2 atop the front frame section 1 in the manner shown in Fig. 2, the following procedure is carried out:

Firstly, the power cylinder is operated to raise the scraper blade unit and the same is link suspended in the manner previously described. Then the piston rod 29 is detached, the pillow blocks 9 disconnected, and the locking pin device 21 arranged so as to prevent castering of the wheel unit 20. Thereafter, with said caster wheel unit 20 blocked against rearward motion, if necessary, the remainder or forward portion of the implement is backed up, causing a relative overlapping of the front and rear frame sections for a major portion of their lengths; this relative sliding movement being guided by the upstanding brackets 34. When the caster wheel 20 is adjacent the intermediate wheels 7, the pillow blocks are reconnected to a tapped attachment plate 35 on the bottom of the rear frame section; there being a depending stop 36 adapted to strike the sleeve 10 to limit the extent to which the frame sections can overlap. After the pillow blocks 9 are attached to the plate 35, the rear frame section, which then balances easily, is swung downwardly at its forward end and forwardly at its rearward end, whence a cross pin 37 is projected between the brackets 34 and through an opening 39 in the rear end portion of the frame section 2 to prevent further tilting thereof in either direction. With the frame sections lapped and secured together, as described, the implement is materially shortened, and can thus travel on highways without difficulty.

After being transported to a new location for use, the above described procedure is merely reversed, and when the frame sections are drawn out to their extended positions, a stop 38 on the forward end of the rear frame section 2 abuts the sleeve 10, whereby to properly locate the parts for reattachment of the pillow blocks to the forward end of said rear frame section.

The described finishing leveler is very efficient, practical, and flexible in operation; providing the advantage of relatively great elongation when in use, but being capable of shortening to a convenient length for transport.

Also, this implement, as in the case of the one shown in the identified copending application, accomplishes very accurate finish leveling or grading, by reason of the particular arrangement of the front and rear frame sections relative to the scraper blade unit 22, and the incorporation of single, wheel trucks supporting the implement front and rear with relatively widely spaced intermediate wheels adjacent but to the rear of said scraper blade unit.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A land leveler comprising an elongated frame structure including a front frame section and a rear frame section, means adapted to connect said sections in partial or substantially fully lapped relation, selectively, the frame sections being normally partially lapped and pivoted together for relative vertical motion, wheel units normally supporting the frame section adjacent opposite ends, another wheel unit supporting the front frame section adjacent its rear end, a vertically adjustable scraper blade unit suspended from the front frame section adjacent said other wheel unit, and power means detachably connected between the scraper blade unit and said rear frame section.

2. A land leveler comprising an elongated frame structure including a front frame section and a rear frame section, means adapted to connect said sections in partial or substantially fully lapped relation, selectively, the frame sections being normally partially lapped and pivoted together for relative vertical motion, wheel units normally supporting the frame sections adjacent opposite ends, another wheel unit supporting the front frame section adjacent its rear end, a vertically adjustable scraper blade unit suspended from the front frame section adjacent said other wheel unit, and power means detachably connected between the scraper blade unit and said rear frame section; the rear frame section being above the front frame section when in said substantially fully lapped position.

3. A land leveler comprising an elongated frame structure including a front frame section and a rear frame section, means adapted to connect said sections in partial or substantially fully lapped relation, selectively, the frame sections being normally partially lapped and pivoted together for relative vertical motion, wheel units normally supporting the frame sections adjacent opposite ends, another wheel unit supporting the front frame section adjacent its rear end, a vertically adjustable scraper blade unit suspended from the front frame section adjacent said other wheel unit, and power means detachably connected between the scraper blade unit and said rear frame section; the rear frame section being above the front frame section when in said substantially fully lapped position, and the wheel unit corresponding to the rear frame section then being clear of the ground.

4. A land leveler as in claim 3 in which said corresponding wheel unit is a caster type; there being means to lock said unit in straight ahead position.

5. A land leveler comprising an elongated frame structure including a front frame section and a rear frame section, the rear frame section and front frame section being adapted to partially or substantially fully lap each other, a pivotal connection on the front frame section intermediate its ends adapted to couple with the rear frame section adjacent its front end or intermediate its ends selectively whereby to partially or substantially fully lap said sections, wheel units supporting the sections adjacent opposite ends, another wheel unit supporting the front frame section adjacent its rear end, a vertically adjustable scraper blade unit suspended from the front frame section adjacent said other wheel unit, power means detachably connected between the scraper blade unit and said rear frame section, and means to lock the rear frame section against pivotal motion when in said substantially fully lapped position.

6. A land leveler as in claim 5 in which said pivotal connection includes a cross member on the front frame section, and transversely spaced pillow blocks on said cross member; said pillow blocks being attachable, selectively, to the rear frame section adjacent its front end or intermediate its ends.

7. A land leveler comprising an elongated frame structure including a front frame section and a rear frame section, the rear frame section and front frame section being adapted to partially or substantially fully lap each other, a pivotal connection on the front frame section intermediate its ends adapted to couple with the rear frame section adjacent its front end or intermediate its ends selectively whereby to partially or substantially fully lap said sections, wheel units supporting the sections adjacent opposite ends, another wheel unit supporting the front frame section adjacent its rear end, a vertically adjustable scraper blade unit suspended from the front frame section adjacent said other wheel unit, power means detachably connected between the scraper blade unit and said rear frame section, and means to lock the rear frame section against pivotal motion when in said substantially fully lapped position; the wheel unit corresponding to the rear frame section being clear of the ground when said section is so locked.

8. A land leveler comprising an elongated frame structure including a front frame section and a rear frame section, the rear frame section and front frame section being adapted to partially or substantially fully lap each other, a pivotal connection on the front frame section intermediate its ends adapted to couple with the rear frame section adjacent its front end or intermediate its ends selectively whereby to partially or substantially fully lap said sections, wheel units supporting the sections adjacent opposite ends, another wheel unit supporting the front frame section adjacent its rear end, a vertically adjustable scraper blade unit suspended from the front frame section adjacent said other wheel unit, power means detachably connected between the scraper blade unit and said rear frame section, and means to lock the rear frame section against pivotal motion when in said substantially fully lapped position; there being guide means on the front frame section to guide relative lapping motion of said sections.

9. A land leveler comprising an elongated frame structure including a front frame section and a rear frame section, the rear frame section and front frame section being adapted to partially or substantially fully lap each other, a pivotal connection on the front frame section intermediate its ends adapted to couple with the rear frame section adjacent its front end or intermediate its ends selectively whereby to partially or substantially fully lap said sections, wheel units supporting the sections adjacent opposite ends, another wheel unit supporting the front frame section adjacent its rear end, a vertically adjustable scraper blade unit suspended from the front frame section adjacent said other wheel unit, power means detachably connected between the scraper blade unit and said rear frame section, and means to lock the rear frame section against pivotal motion when in said substantially fully lapped position; there being guide means on the front frame section to guide relative lapping motion of said sections, said locking means being a connecting member between the guide means and the rear frame section.

10. A land leveler comprising an elongated frame structure including a front frame section and a rear frame section, the rear frame section and front frame section being adapted to partially or substantially fully lap each other, a pivotal connection on the front frame section intermediate its ends adapted to couple with the rear frame section adjacent its front end or intermediate its ends selectively whereby to partially or substantially fully lap said sections, wheel units supporting the sections adjacent opposite ends, another wheel unit supporting the front frame section adjacent its rear end, a vertically adjustable scraper blade unit suspended from the front frame section adjacent said other wheel unit, power means detachably connected between the scraper blade unit and said rear frame section, and means to lock the rear frame section against pivotal motion when in said substantially fully lapped position; there being a pair of transversely spaced guide brackets upstanding from the rear portion of the front frame section, and the rear frame section being disposed therebetween for guided lapping motion relative to the front frame section.

11. A land leveler comprising an elongated frame structure including a front frame section and a rear frame section, the rear frame section and front frame section being adapted to partially or substantially fully lap each other, a pivotal connection on the front frame section intermediate its ends adapted to couple with the rear frame section adjacent its front end or intermediate its ends selectively whereby to partially or substantially fully lap said sections, wheel units supporting the sections adjacent opposite ends, another wheel unit supporting the front frame section adjacent its rear end, a vertically adjustable scraper blade unit suspended from the front frame section adjacent said other wheel unit, power means detachably connected between the scraper blade unit and said rear frame section, and means to lock the rear frame section against pivotal motion when in said substantially fully lapped position; there being a pair of transversely spaced guide brackets upstanding from the rear portion of the front frame section, and the rear frame section being disposed for guided lapping motion relative to the front frame section, said locking means being a cross member adapted to extend between the guide brackets and through said rear frame section when the latter is in said substantially fully lapped position.

ALBERT G. GURRIES.
JOHN A. WHITE, Jr.

REFERENCES CITED

The following references are of record in the file of this patent:

UNITED STATES PATENTS

| Number | Name | Date |
|---|---|---|
| 721,525 | Rand | Feb. 24, 1903 |
| 949,071 | Helmke | Feb. 15, 1910 |
| 1,868,122 | Tharp | July 19, 1932 |
| 2,255,062 | Johnson | Sept. 9, 1941 |
| 2,333,988 | Demond | Nov. 9, 1943 |